United States Patent [19]
Hugenberg et al.

[11] Patent Number: 5,924,039
[45] Date of Patent: Jul. 13, 1999

[54] DIGITAL MULTICHANNEL MULTIPOINT DISTRIBUTION SYSTEM (MMDS) NETWORK THAT SUPPORTS BROADCAST VIDEO AND TWO-WAY DATA TRANSMISSIONS

[75] Inventors: Keith Hugenberg, San Ramon; Malcom I. Ziegler, Walnut Creek; Malik Audeh, Sunnyvale, all of Calif.

[73] Assignee: Telesis Technologies Laboratory, San Ramon, Calif.

[21] Appl. No.: 08/698,056

[22] Filed: Aug. 13, 1996

[51] Int. Cl.⁶ ............... H04Q 7/36; H04H 1/00
[52] U.S. Cl. ............ 455/454; 455/3.1; 455/3.2; 455/5.1; 455/66
[58] Field of Search .................. 455/454, 422, 455/446–8, 450, 562, 3.1, 6.3, 63, 66, 3.2, 4.2, 5.1; 348/12, 13, 7

[56] References Cited

U.S. PATENT DOCUMENTS

| | | | |
|---|---|---|---|
| 4,747,160 | 5/1988 | Bossard | 455/422 |
| 5,410,737 | 4/1995 | Jones | 455/454 |
| 5,483,667 | 1/1996 | Faruque | 455/447 |

*Primary Examiner*—Edward F. Urban
*Assistant Examiner*—Philip J. Sobutka
*Attorney, Agent, or Firm*—Sawyer & Associates

[57] ABSTRACT

The present invention comprises a MMDS broadcast digital video cell system on one polarization and a smaller array of cells, designed for two way services that use the orthogonal polarization in the same area. The present invention includes a method for distributing information in a MMDS network comprising the steps of providing a video signal in a first polarization to a first area, the video signal having a frequency within a predetermined set of frequencies, the method further includes providing a two-way digital signal in a second polarization to the first area, the two-way digital signal having a frequency within the predetermined set of frequencies, wherein the second polarization is orthogonal to the first polarization. The present invention also includes a system for distributing information in a MMDS network comprising a digital video signal transmitter, wherein the video signal has a first polarization. In addition, the video signal has a first frequency within a predetermined set of frequencies. The system also includes a digital video signal receiver at a receiver site and a digital communication signal transmitter for transmitting communication signals wherein the communication signal has a second polarization. The communication signal has a frequency within the same predetermined set of frequencies. Finally, a digital communication signal receiver is located at the receiver site.

15 Claims, 8 Drawing Sheets

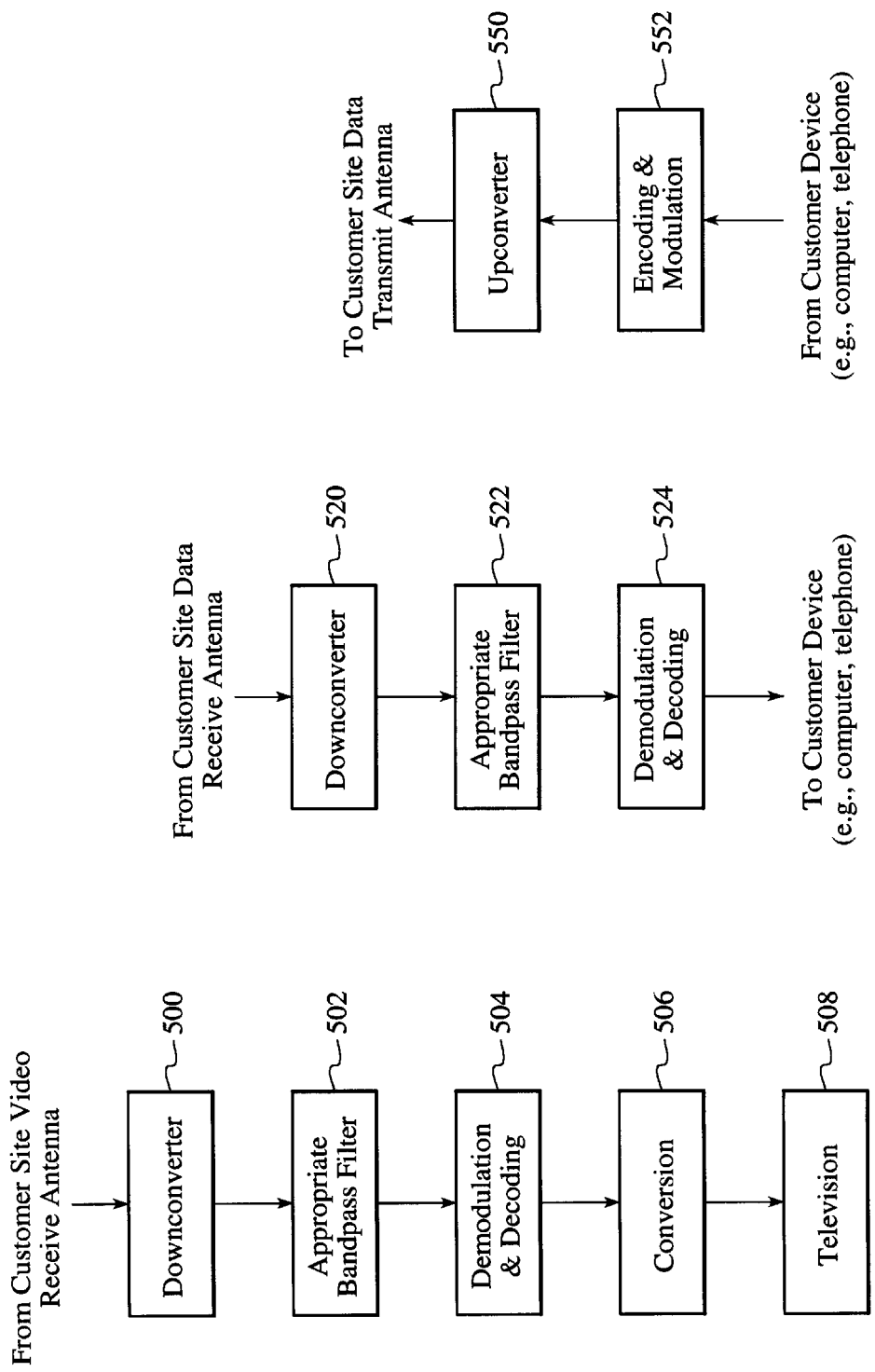

|  | Digital Video | 2-way Service |
|---|---|---|
| Transmit Power (Average) per Channel: | 47dBm | 27 dBm |
| Transmit Antenna gain | +16 dBi | +10 dBi |
| Waveguide Loss | -4.0 dB | -1.0 dB |
|  |  |  |
| EIRP/channel | 59.0 dBm | 36 dBm |
|  |  |  |
| Free Space Loss | -134.70 dB (35 miles) | -117.80 (5 miles) |
| Miscellaneous loss (RFI, Grazing, Aiming, Rain) | -3.5 dB | -1.0 dB |
|  |  |  |
| Signal Level into Receive Antenna | -79.2 dBm | -82.8 dBm |
|  |  |  |
| Receive Antenna Gain | +21 dBi | +21 dBi |
|  |  |  |
| Signal Level into Downconverter | -58.2 dBm | -61.2 dBm |
|  |  |  |
| Downconverter Gain | +20 dB | +20 dB |
|  |  |  |
| Signal Level out of Downconverter | -38.2 dBm | -41.2 dBm |
|  |  |  |
| Noise floor (6 MHz) | -106 dBm | -106 dBm |
| Downconverter Gain | 20 dB | 20 dB |
| Downconverter Noise Figure (NF) | 2.5 dB | 2.5 dB |
| Noise level out of Downconverter | -83.5 dBm | -83.5 dBm |
| NF Contribution from modem/settop and cable loss | 0.4 dB | 0.4 dB |
| Cable loss | -3 dB | -3 dB |
|  |  |  |
| Noise level into Modem/Settop Receiver | -86.9 dBm | -86.9 dBm |
| Signal Level into Modem/Settop Receiver | -41.2 dBm | -44.2 dBm |
| S/N Ration into Modem/Settop Receiver | 45.7 dB | 42.7 dB |
|  |  |  |
| S/N Threshold of Demod w/RS FEC (64 QAM) | 24.5 dB | 24.5 dB |
| Available Margin | 21.2 dB (@35 miles) | 18.2 dB (@5 miles) |
|  |  |  |
| *Required Fade Margin (F) for 99.9% avail. | 18.6 dB | NA |
| Extra Margin for 99.9% @ 35 miles | 3.3 dB | 18.2 dB |

* Based on the Bullington model: $F = -10\log((1-\text{Avail.})/(2.5 \ast a \ast b \ast f \ast D^3 \ast 10^{-6}))$;
  a=1, b=0.25, f=(GHz), D=(miles)

FIG. 8

DIGITAL MULTICHANNEL MULTIPOINT DISTRIBUTION SYSTEM (MMDS) NETWORK THAT SUPPORTS BROADCAST VIDEO AND TWO-WAY DATA TRANSMISSIONS

FIELD OF THE INVENTION

The present invention relates generally to the distribution of information on a wireless communications network and more particularly to the distribution of communication information on a MMDS network.

BACKGROUND OF THE INVENTION

Video information is distributed over a communications network generally in two conventional ways (wireless (i.e., MMDS) and wireline (CATV)). Either of these services can be analog or digital.

A conventional wireless video signal is transmitted in a predetermined frequency range from a one-way broadcast video transmission site in a first polarization (i.e., either horizontal or vertical). The wireless video signal is then received at a customer site in the same polarization, via a video antenna.

To more particularly describe a conventional MMDS video distribution system, refer now to FIG. 1.

FIG. 1 is a block diagram of a conventional video distribution system 100 which, for example, operates over a range of up to 35 miles. A video signal is transmitted from a broadcast video transmission site 106 by an antenna 102 in a given polarization such as horizontal polarization. In this system, the antenna 102 is designed such that cross-polarization polarization rejection is typically at some minimum value such as 20dB. Accordingly, the effective radiated power of this transmitter may be up to hundreds of Watts. The video signal is then received in the same (horizontal) polarization by a video antenna 108 at a customer site 104.

One conventional frequency range that video signals are transmitted in such a system is between 2150–2162 Mhz and 2500–2686 MHz (i.e., 33 6 MHz channels). This frequency spectrum is referred to as a multichannel multipoint distribution system (MMDS).

Background information regarding local multipoint distribution systems (LMDS) (28 GHz) with details of cellular techniques, polarization diversity, spatial diversity, and frequency reuse can be found in U.S. Pat. No. 4,747,160, issued May 24, 1988 to Bossard. Background information regarding point-to-multipoint radio communication system including a master station and a plurality of remote stations which communicate with the master station using frequency division multiplexing can be found in U.S. Pat. No. 4,528,656, issued Jul. 9, 1985 to Morais. Other patents that discuss polarized modulation or the use of horizontal and vertical polarization in the context of radio transmissions include U.S. Pat. No. 2,992,427, issued Jul. 11, 1961 to Franco; U.S. Pat. No. 3,882,393, issued May 6, 1975 to Epstein; U.S. Pat. No. 4,220,923, issued Sep. 2, 1980 to Pelchat et al.; U.S. Pat. No. 4,321,705, issued Mar. 23, 1982 to Namiki; and U.S. Pat. No. 4,521,878, issued Jun. 4, 1985 to Toyonaga. Finally, U.S. Pat. Nos. 3,864,633, issued Feb. 4, 1975 to Stenglein, and 4,525,861, issued Jun. 25, 1985 to Freeburg may be of general relevance.

In analog MMDS systems, as before mentioned, the response channels from the customer site have been limited (typically by FCC regulation) to a small bandwidth (125 kHz wide) for voice or data transmission. The bandwidth of these response channels severely limits their use to transmit information from the customer site to the transmission site. The use of the frequencies are restricted typically by the communication authorities.

Accordingly, what is needed is a system and method for allowing more information to be distributed over a digital MMDS network. The system and method should be easily implemented, cost effective and easily adaptable to existing communication networks. The present invention addresses such a need.

SUMMARY OF THE INVENTION

The present invention comprises a MMDS broadcast digital video cell system on one polarization and a smaller array of cells, designed for two way services that use the orthogonal polarization in the same area.

The present invention includes a method for distributing information in a MMDS network comprising the steps of providing a video signal in a first polarization to a first area, the video signal having a frequency within a predetermined set of frequencies, the method further includes providing a two-way digital signal in a second polarization to the first area, the two-way digital signal having a frequency within the predetermined set of frequencies, wherein the second polarization is orthogonal to the first polarization.

The present invention also includes a system for distributing information in a MMDS network comprising a digital video signal transmitter, wherein the video signal has a first polarization. In addition, the video signal has a first frequency within a predetermined set of frequencies. The system also includes a digital video signal receiver at a receiver site and a digital communication signal transmitter for transmitting communication signals wherein the communication signal has a second polarization. The communication signal has a frequency within the same predetermined set of frequencies. Finally, a digital communication signal receiver is located at the receiver site.

The present invention allows the network operators to provide greater than 295 channels (3Mb/s each) of digital broadcast video simultaneously with a complete two-way service using the same spectrum in the same protected service area as those used for the digital broadcast video. The two-way service can include telephony, video conferencing, and internet access.

The cross-polarization technique and the overlay network design will be more fully understood by reference to the following drawings.

BRIEF DESCRIPTION OF THE DRAWINGS

FIG. 7A shows a system and method of reception of digital video at the customer site.

FIG. 7B shows a system and method of reception at the customer site after data is received on the vertically polarized two-way antenna.

FIG. 7C shows a system and method of the uplink path from the customer data device (e.g., computer) to the vertically polarized two-way antenna.

FIG. 8 is a table of an example of link budgets for both the digital video service and the two-way data/telephony.

DETAILED DESCRIPTION OF THE INVENTION

The present invention relates to a distribution of information in a communications system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

A system and method according to the present invention is a two-way digital network using a polarization orthogonal to the polarization of a larger digital broadcast video cell system The present invention can be thought of as a digital cellular network that is overlaid onto a digital broadcast video network. The digital overlay network is preferably completely autonomous from the broadcast video network, and in this way, leverages the entire spectrum for both service offerings. The interference between the broadcast video and the services network can be minimized through the use of polarization diversity techniques.

The method and system according to the present invention allows both the two-way digital "cellular" network and the digital broadcast video network to use the entire available spectrum simultaneously. An example of a spectrum which can be utilized with the present invention is the MMDS spectrum. Assuming the MMDS operator has access to all 33 licenses (i.e., 33 6 MHz channels), the present invention would allow the MMDS operators to provide greater than 295 channels (3 Mb/s each) of digital broadcast video along with a complete two-way service offering, including telephone, video conferencing, internet access, etc. in the same protected service area, which is typically thirty-five miles.

Figure 1:
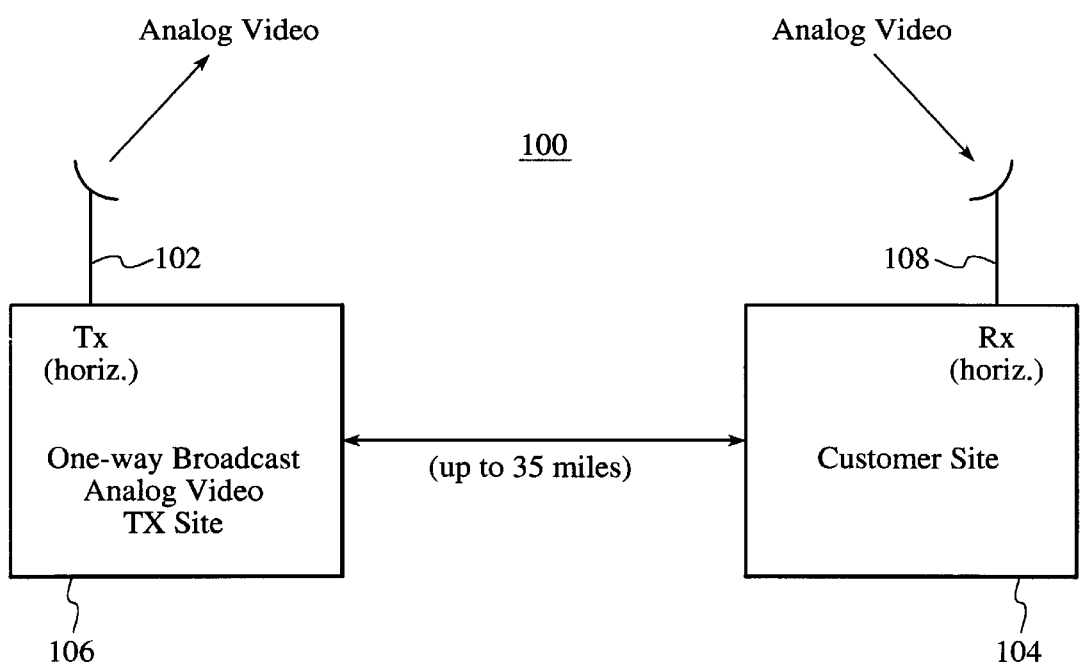
FIG. 1 is a block diagram of a standard one-way multi-channel analog or digital video distribution system typically operating over a range of up to thirty-five miles.
Figure 2:
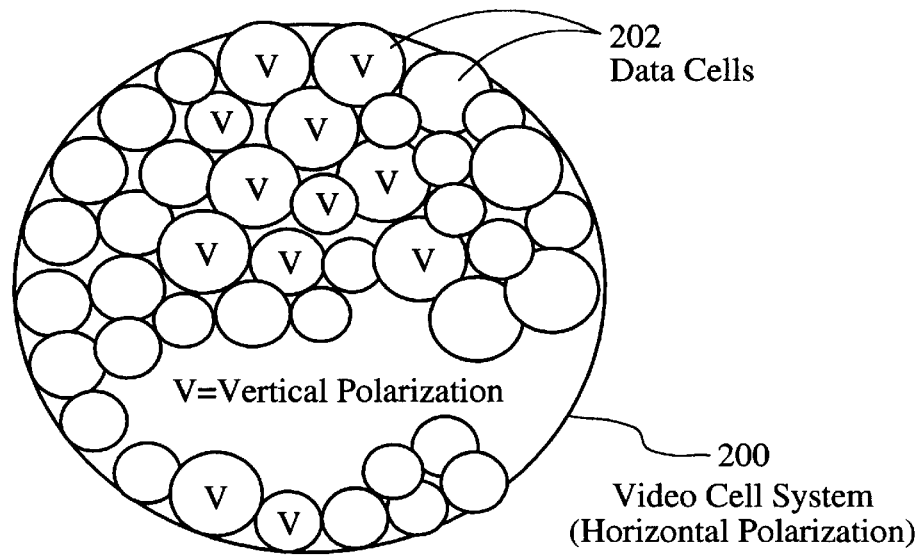
FIG. 2 is a conceptual diagram of a top plane view of an overlay network using the cross polarization technique according to the present invention.

FIG. 2 is a conceptual diagram of a top plane view of an overlay network using the cross polarization technique according to the present invention. It includes a broadcast digital video cell system 200 which uses one polarization, such as horizontal. In the case of a video cell system 200 utilizing the MMDS spectrum, the cell 200 would typically encompass an area with five to thirty-five mile radii.

The digital video cell system 200 is overlaid with an array of two-way cells 202 within the same licensed area. The array of two-way cells 202 is designed for two-way services that uses a different polarization from the one used for the digital video cell system 200. Assuming the digital video cell system 200 uses a horizontal polarization, the two-way cells 202 would use vertical polarization. This allows the entire spectrum in the typical thirty-five mile protected service area to be used for both the two-way service network as well as the digital broadcast network, while allowing for significant simplicity and flexibility in both network designs.

Transmit and receive antennas in both networks are preferably selected with high cross polarization specifications. In this way the operator has the ability to design two different networks, that through suitable modulation and link margins, should substantially decrease any interference between the two systems.

Figure 3A:
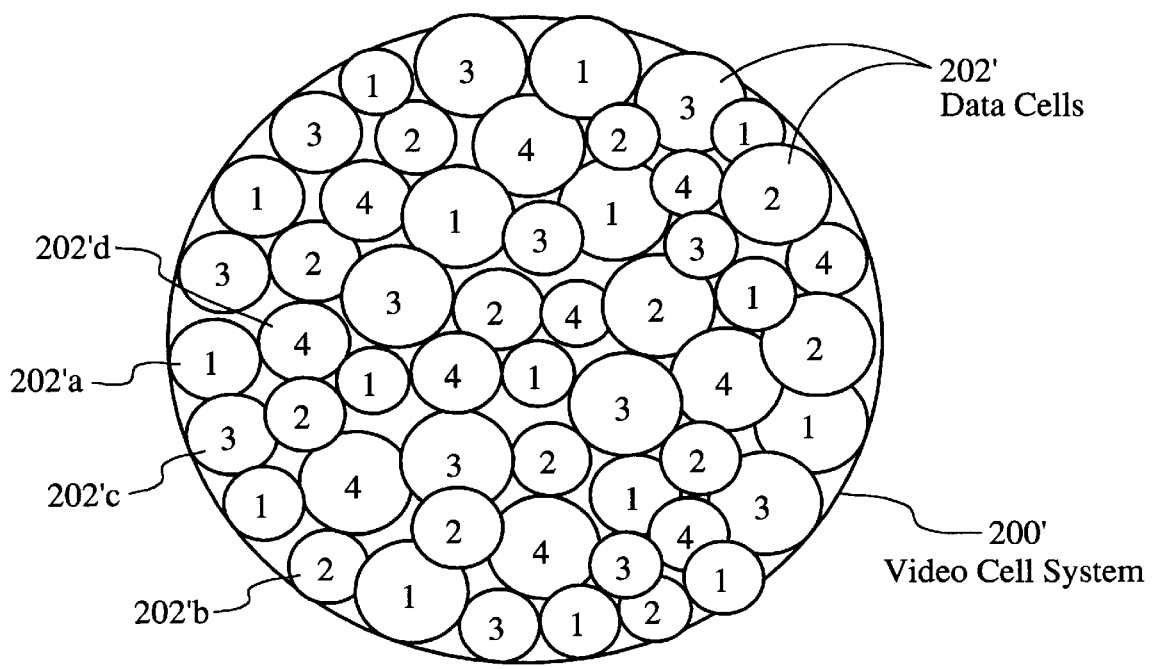
FIG. 3A is a top plane view illustrating one of the possible frequency reuse plans for the two-way digital service network according to the present invention.
Figure 3B:
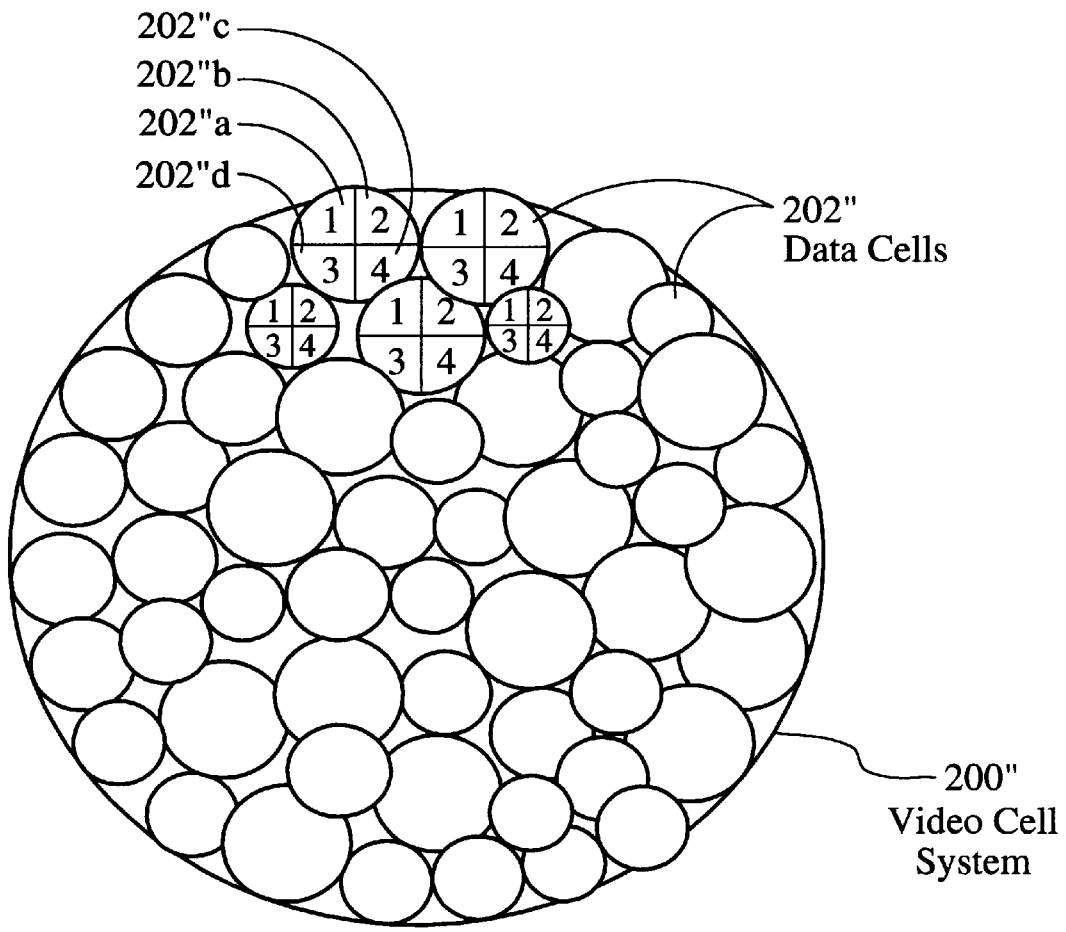
FIG. 3B is a top plane view illustrating an alternative frequency reuse plan for the two-way digital service network according to the present invention.

The two-way network system and method according to the present invention is based on a cellular array approach which could use a variety of two-way cell 202 designs. Two embodiments of two-way cell 202 designs are shown in FIGS. 3A and 3B. Both designs use a four-fold frequency reuse pattern.

FIG. 3A is a top plane view illustrating one of the possible frequency reuse plans for the two-way digital service network according to the present invention. A video cell system 200' is overlaid with an array of two-way cells 202'. The array of two-way cells 202' include a plurality of two-way cells 202'a–202'd that use varying frequency bands. This approach uses the same frequency band throughout the entire cell 202'a for the downstream data. It is surrounded by only those cells 202'b–202'd with the other three frequency bands in order to minimize interference.

Figure 4:
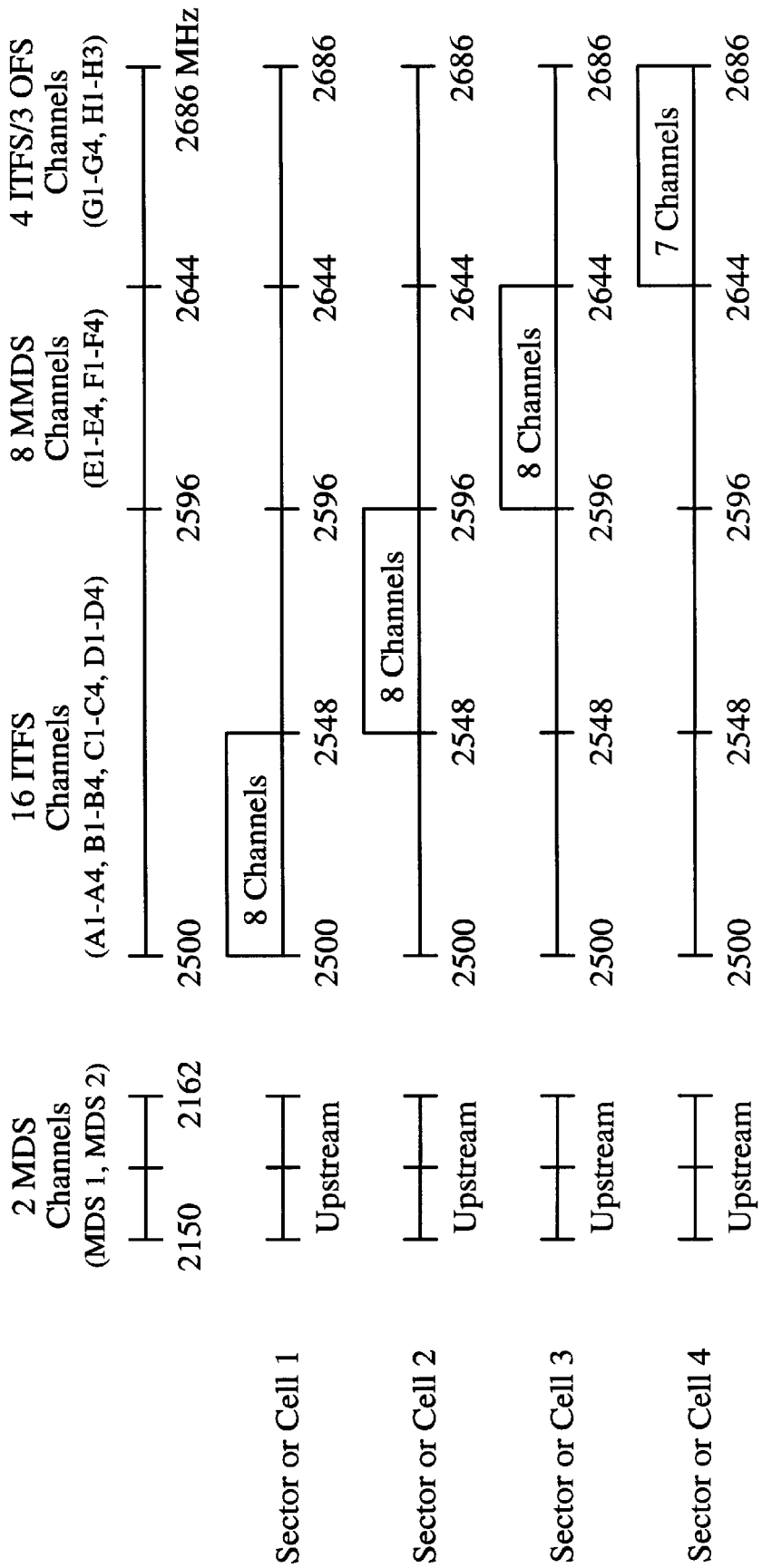
FIG. 4 illustrates the frequency band of a typical MMDS network. It also provides an example of a possible frequency allocation for a four-fold frequency reuse data system.

FIG. 4 illustrates the frequency channels of a typical MMDS network. As shown in FIG. 4, each frequency band can be as much as 48 MHz, with the exception of the fourth, which can be 42 MHz.

FIG. 3B is a top plane view illustrating an alternative four-fold frequency reuse plan for the two-way digital service network according to the present invention. The video cell system 200" is overlaid with two-way cells 202", where each two-way cell 202" is divided into four sectors or quadrants 202"a–202"d, where each quadrant 202"a–202"d has its own frequency band. Of course, increasing the number of sectors and frequency reuse is also possible depending on desired capacities and link margins (i.e., 12-fold and 30 degree sectors).

The selection of one method over the other would depend on various factors such as demographics, licenses, the topography, the selected RF hardware, and the link budgets. The response path (upstream) for the two-way service can use MDS 1 and MDS 2 in each cell (two channels 2150–2162 MHz). But again, any portion of the MMDS spectrum could be used for upstream service.

Figure 5:
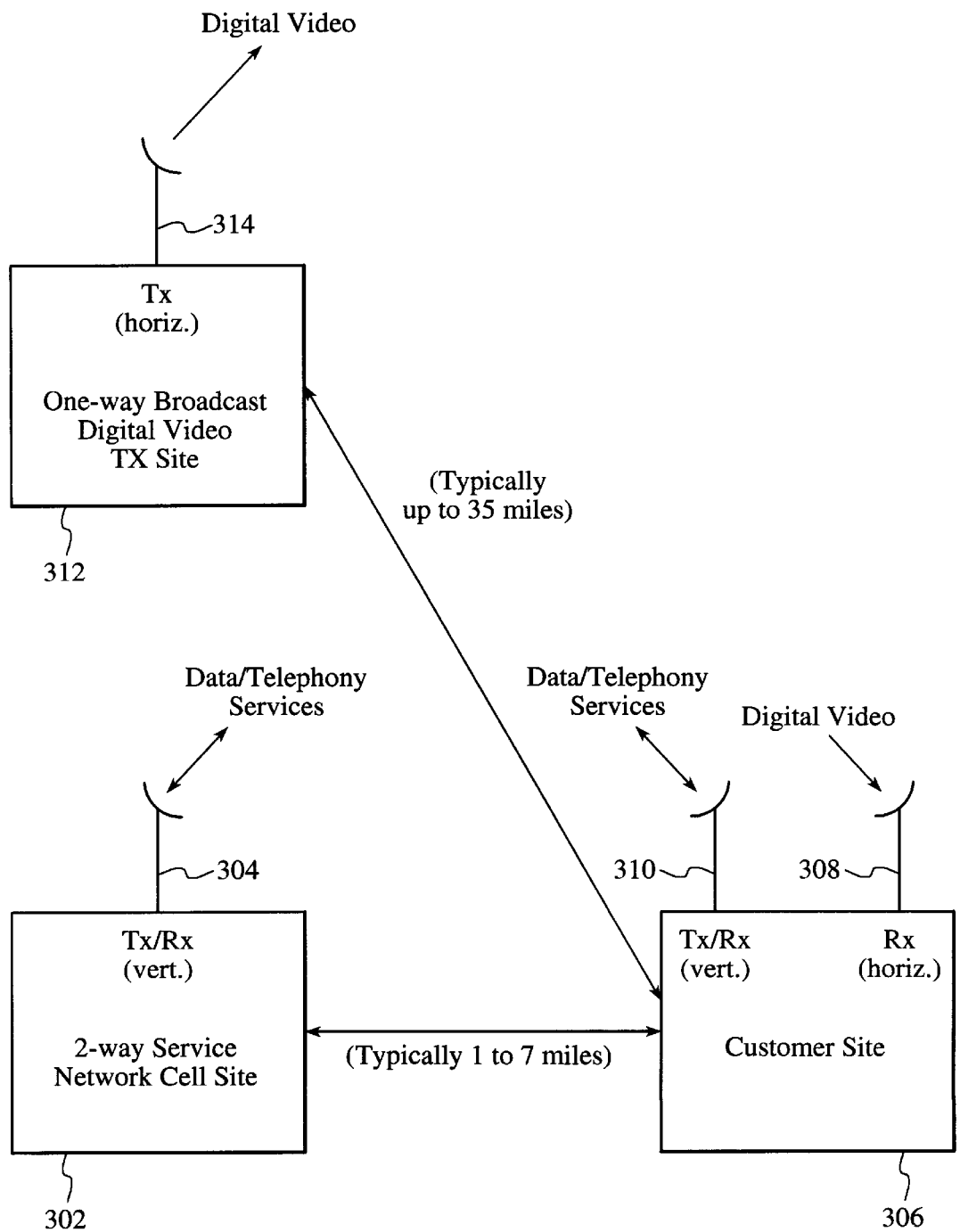
FIG. 5 depicts the overlay of the two-way service network with the digital video service, thus allowing both services to be simultaneously received by the customer.

FIG. 5 depicts the addition (or overlay) of the two-way service network with the digital video service, thus allowing both services to be simultaneously received by the customer. FIG. 5 shows a system and method of a two-way network 300 according to the present invention. The video signal is sent from the one-way broadcast digital video transmission site 312 via the digital video antenna 314. The video transmission site 312 is typically up to 35 miles from the customer site 306. The two-way network 300 includes a two-way service network cell site 302, a cell site antenna 304 which transmits to a customer site 306. The customer site 306 includes a two-way antenna 310 for receipt and transmission of two-way signals, and a video antenna 308 for receipt of video signals. The network cell site and subscriber site can be located in one of the two-way cells 202 of FIG. 2.

The network cell site 302 transmits data on a polarization orthogonal to the video signal via the cell site antenna 304. In this example, the video signal has a horizontal polarization while the network cell site 302 transmits on a vertical polarization. The two-way antenna 304 located on the network cell site 302 is preferably a vertically polarized receiving antenna with similar specification of gain and cross-polarization as the customer receive antennas 310.

At the customer site 306, the video antenna 308 is used simultaneously with the two-way antenna 310. The horizontally polarized video antenna 308 receives the digital video signals while the vertically polarized two-way antenna 310 transmits and receives the two-way services such as data/ telephonic services.

Each video antenna 308 of FIG. 5 used for receiving the digital broadcast video (video cells system 200 of FIGS. 2 and 3 with 5–35 mile radii) would preferably have antenna gains higher than 15 dBi, a cross polarization specification approaching 30 dB at the boresight, and sidelobes that are at least 18 dB down from the main lobe.

All the receive antennas 304, 310, 308 of FIG. 5 and matching downconverters 500, 520 would also preferably be designed to receive the entire 33 channels, two between 2150–2162 MHz and thirty-one between 2500–2686 MHz. The modulation of the digital video can be any higher order modulation, N-QAM (Quadrature Amplitude Modulation) or N-VSB (Vestigial Side Band) (i.e., 64 QAM). Sixty-four level QAM chips with Reed Solomon Forward Error correction can provide approximately 27 Mb/s of information payload per 6 MHz channels with a signal to noise threshold of 24.5 dB (correct BER $10^{-9}$).

Each receive two-way antenna 310, 304 used for the two-way digital services should preferably have specifications for gain, cross polarization and side lobes comparable to the digital video receive antennas 308. This will allow flexibility in designing the two-way digital network (typical cell 202 radii of one to seven miles nominally).

The transmit antennas 314 for the digital video broadcast and the two-way network can be omnidirectional or directional, but would preferably also meet a cross polarization specification of 30 dB.

Figure 6:
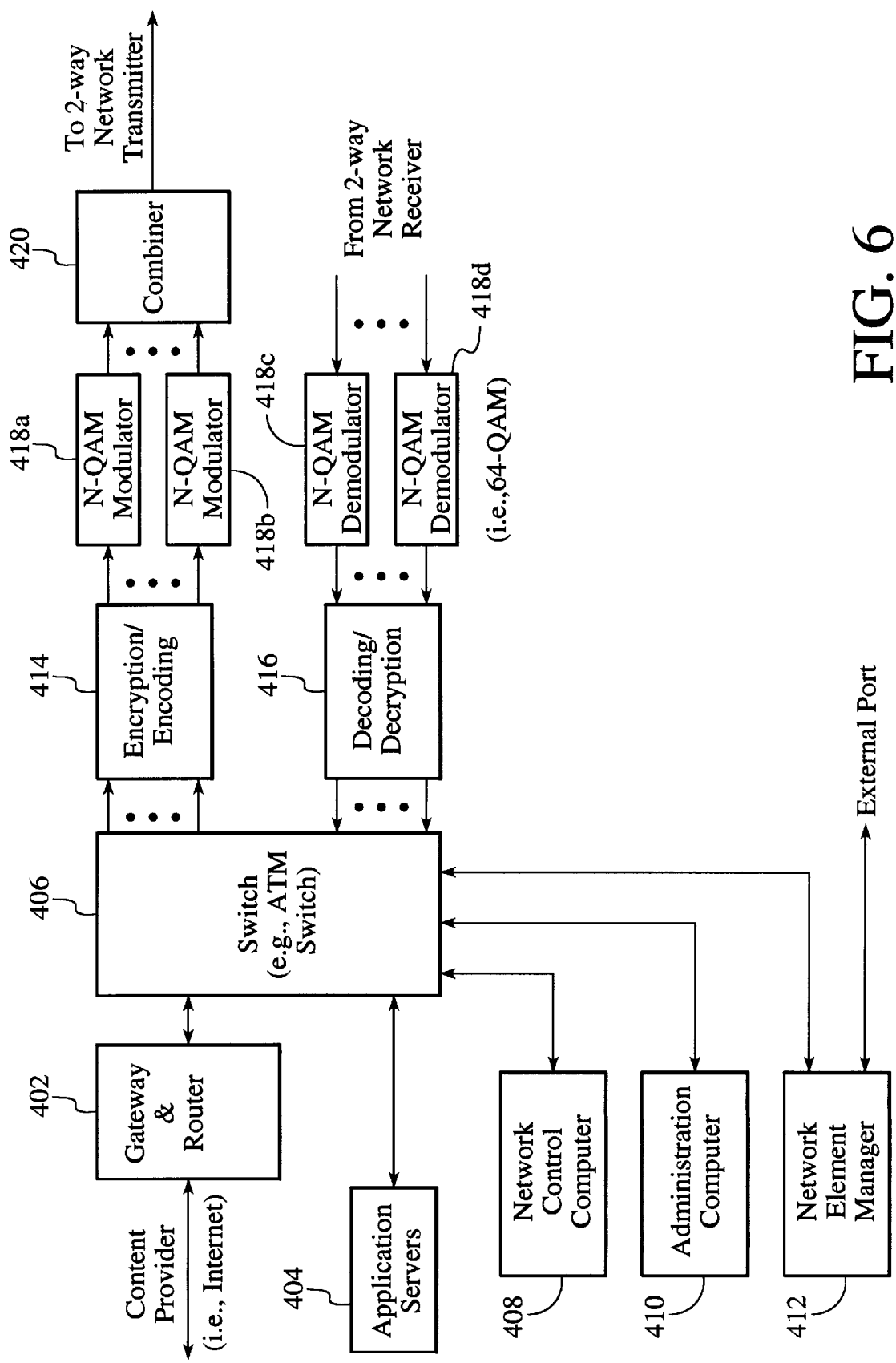
FIG. 6 is a schematic diagram of the network cell site location and its functionality.

A schematic diagram of an example of the data network cell (head end) site location 302 and its functionality is shown in FIG. 6. It includes a gateway and router 402, a switch 406, application servers 404, network control computer 408, an administration computer 410, a network element manager 412, encryption/encoding 414, decoding decryption 416, modulators 418a–418d, and a combiner 420.

The cell site input for the data service arrives from a content provider such as the Internet. After passing through the gateway and router 402, it passes to a switch 406, such as an asynchronous transfer mode (ATM) switch. There can be numerous control mechanisms that provide functions such as fault detection, error reporting, billing, and authorizations. The application servers 404 may hold navigation programs, banking programs, or other applications. The output data from the switch 406 for each particular user is then encrypted for security and encoded for forward-error-correction via encryption/encoding 414. This is followed by the N-QAM modulator 418. After the signals for all users are modulated, they must be combined and sent to the transmitter via the combiner 420 for channelization and upconversion to MMDS frequencies. At the customer site 306, the signal after downconversion and filtering passes through a sequence of operations that are essentially the reverse of those described above.

In order to take advantage of the current trend in chip designs for both cable modems and for digital video transport over coaxial cable, the DVB (Digital Video Broadcast) compliant N-QAM chip sets can be selected for both the digital broadcast video network as well as the two-way digital network.

Based on most areas in the United States, and because allowable average transmit digital power could be as high as 50 Watts per channel with current equipment, 64 QAM is the preferred digital video modulation to cover the typical 35 mile protected service area. This is also the current modulation level for most cable modems and coaxial cable video transport. The corresponding capacity for the DVB 64 QAM is approximately 27 Mb/s of information payload in a 6 MHz channel. This corresponds to the equivalent of 890 Mb/s for the system bitrate capacity or over 295 three Mb/s digital video channels.

DVB 64 QAM can also be a potential selection for the smaller two-way cells 202 of FIGS. 2 and 3, depending on desired cell 202 size, robustness, and capacity tradeoffs. Because of the cross polarization design and the smaller cell 202 array approach for two-way, even with much lower power transmitters, the margins could be made comparable to the broadcast video service.

Functional block diagrams of the customer site 306 for both the digital video and two-way services is shown in FIGS. 7A, 7B, and 7C.

FIG. 7A shows a system and method of reception of digital video at the customer site 306. The video signal from the horizontally polarized receive video antenna 308 of FIG. 5 is downconverted to the proper frequency range via the downconverter 500. Then it is filtered for the appropriate channel through the bandpass filter 502, and demodulated and decoded through decoder 504. Since current television sets do not support digitally-compatible pictures, a settop box converts the signal via conversion 506 into NTSC analog format such that the signal may be viewed on the television set 508.

FIG. 7B shows a system and method of reception at the customer site after data is received on the vertically polarized two-way antenna 310 of FIG. 5. The data signal is downconverted in the downconverter 520, filtered through the appropriate bandpass filter 522, demodulated, and decoded in the decoder 524. At that point, the bit stream can be passed to a customer device such as a computer or a telephone.

FIG. 7C shows a system and method of the uplink path from the customer data device (e.g., computer) to the vertically polarized two-way antenna 310. The data is encoded and modulated in the encoding and modulation device 552. It is then upconverted through the upconverter 550 to an appropriate frequency at the appropriate range (see FIG. 3), based on its location.

A summary example link budgets for both the digital video service and the two-way data/telephony are shown in FIG. 8. Because the broadcast video source is the primary source of revenue for MMDS operators, it is assumed in this example that the data network will be designed with much less powerful transmitters in order to minimize interference with the video signals. Therefore, for the purposes of the example link budget, 0.5 W (equals 27 dBm) per 6 MHz channel for the data service is assumed. Of course, another option open to the operator is to transmit both the video and data signals from the transmit location on their respective transmitters.

The free-space loss (in dB) of the signal is given by 35.86+20 log (f(GHz)*1000)+20 log (D(miles)). The additional losses due to other radio-frequency interference, rain and aiming mismatch, are assumed to be small for the data network design. The noise power (in dBm) at the receiver is given by −114+10 log B, where B is the radio-frequency bandwidth of a specific channel (in MHz). Note that in both cases, the signal-to-noise ratio is preferably sufficient to maintain high quality video and data communications for modulation schemes using 64-QAM or lower in order. As an example, DVB 64-QAM modulation, with (204, 188, T=8) Reed-Solomon error-control coding, requires 24.5 dB to achieve a $1 \times 10^{-9}$ corrected bit error rate (BER).

The two-way system design could carry any type of digital service: telephony, videoconferencing, internet traffic, high speed images, etc. The multiple access method could also be any number of choices such as code division multiple access (CDMA), time division multiple access (TDMA), or frequency division multiple access (FDMA).

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

We claim:

1. A method for distributing information in a MMDS network comprising:
    a) providing a video signal in a first polarization to a first area, the video signal having a frequency within a predetermined spectrum of frequencies; and
    b) providing a two-way digital signal in a second polarization to the first area, the two-way digital signal having a frequency within the predetermined spectrum of frequencies, and the two-way digital signal being modulated by a high order modulation which includes one of a quadrature amplitude modulation (N-QAM) and a vestigial side band (N-VSB), wherein the second polarization is orthogonal to the first polarization to minimize interference between the two-way digital signal and the video signal.

2. The method of claim 1, wherein the spectrum of frequencies is a set of Multichannel Multipoint Distribution System frequencies.

3. A method for distributing information in a MMDS network comprising:
    a) providing a video signal in a first polarization to a first area, the video signal having a frequency within a predetermined spectrum of frequencies; and
    b) enabling cellular digital data communication between the first area and a second area using a two-way digital signal in a second polarization having a frequency within the predetermined spectrum of frequencies, the two-way digital signal being modulated by a high order modulation which includes one of a quadrature amplitude modulation (N-QAM) and a vestigial side band (N-VSB).

4. The method of claim 3, wherein the predetermined spectrum of frequencies is a set of Multichannel Multipoint Distribution System frequencies.

5. The method of claim 3, wherein the first polarization is orthogonal to the second polarization to minimize interference between the two-way digital signal and the video signal, and wherein the two-way digital signal is substantially autonomous from the video signal for allowing both, the two-way digital signal and the video signal, to use the entire spectrum of frequencies substantially simultaneously.

6. The method of claim 3, wherein the first area includes a plurality of sub-areas.

7. The method of claim 6, wherein the plurality of sub-areas use varying frequency bands within the predetermined spectrum of frequencies.

8. The method of claim 6, wherein the plurality of sub-areas areas divided into groups such that each sub-area in a group uses a frequency band different from all other frequency bands used by the other sub-areas in that group.

9. The method of claim 6, wherein each sub-area is divided into a plurality of sectors such that each sector has its own frequency band.

10. A system for distributing information in a MMDS network comprising:
    means for transmitting digital video signals having a first polarization and a first frequency within a predetermined spectrum of frequencies;
    means for receiving the digital video signals;
    means for transmitting two-way digital signals having a second polarization, the two-way digital signal being modulated by a high order modulation which includes one of a quadrature amplitude modulation (N-QAM) and a vestigial side band (N-VSB), the two-way digital signals having a second frequency within the predetermined spectrum of frequencies; and
    means for receiving the two-way digital signals.

11. The system of claim 10, wherein the means for receiving the two-way digital signals is located within a predefined area in which the means for receiving the video signals is located.

12. The system of claim 10, wherein the spectrum of frequencies is a set of Multichannel Multipoint Distribution System frequencies.

13. The system of claim 10, wherein the first and second polarizations are orthogonal to each other to minimize interference between the two-way digital signal and the video signal, and wherein the two-way digital signal is substantially autonomous from the video signal for allowing both, the two-way digital signal and the video signal, to use the entire spectrum of frequencies substantially simultaneously.

14. A system for distributing information in a MMDS network comprising:
    a digital video signal transmitter, wherein the video signal has a first polarization and a first frequency within a predetermined spectrum of frequencies;
    a digital video signal receiver at a receiver site;
    a two-way digital signal transmitter, wherein the two-way signal has a second polarization and a second frequency within the predetermined spectrum of frequencies, the two-way digital signal being modulated by a high order modulation which includes one of a quadrature amplitude modulation (N-QAM) and a vestigial side band (N-VSB); and
    a two-way digital signal receiver at the receiver site.

15. The system of claim 14, wherein the first and second polarizations are orthogonal to each other to minimize interference between the two-way digital signal and the video signal, and wherein the two-way digital signal is substantially autonomous from the video signal for allowing both, the two-way digital signal and the video signal, to use the entire spectrum of frequencies substantially simultaneously.

* * * * *